Sept. 27, 1938.  R. W. DINZL  2,131,345

RUBBER BALE CUTTER

Filed Feb. 25, 1937

INVENTOR
R. W. DINZL
BY
ATTORNEY

Patented Sept. 27, 1938

2,131,345

UNITED STATES PATENT OFFICE 2,131,345

RUBBER BALE CUTTER

Richard W. Dinzl, Narberth, Pa., assignor to Baldwin-Southwark Corporation, a corporation of Delaware Application February 25, 1937, Serial No. 127,715

4 Claims. (Cl. 164—36)

This invention relates generally to rubber bale cutters and more particularly to an improved knife arrangement therefor.

In rubber bale cutters, considerable difficulty is experienced in providing knives that will effectively cut the rubber with minimum power. In fact, with certain knife arrangements, the force required to push the rubber through the knives may generate such a great amount of friction between the rubber and the knives as to cause the latter to be seriously injured or broken.

It is an object of my invention to provide an improved knife arrangement for a rubber bale cutter whereby the rubber may be efficiently and effectively cut with minimum obstruction and resistance to the passage of the rubber after it has passed the cutting edge of the knives.

A further object is to provide an improved knife arrangement having the foregoing desirable characteristics while at the same time lending itself to a very simple and economical construction that has a high degree of inherent ruggedness.

Other objects and advantages will be more apparent to those skilled in the art from the following description of the accompanying drawing in which.

Figure 1:
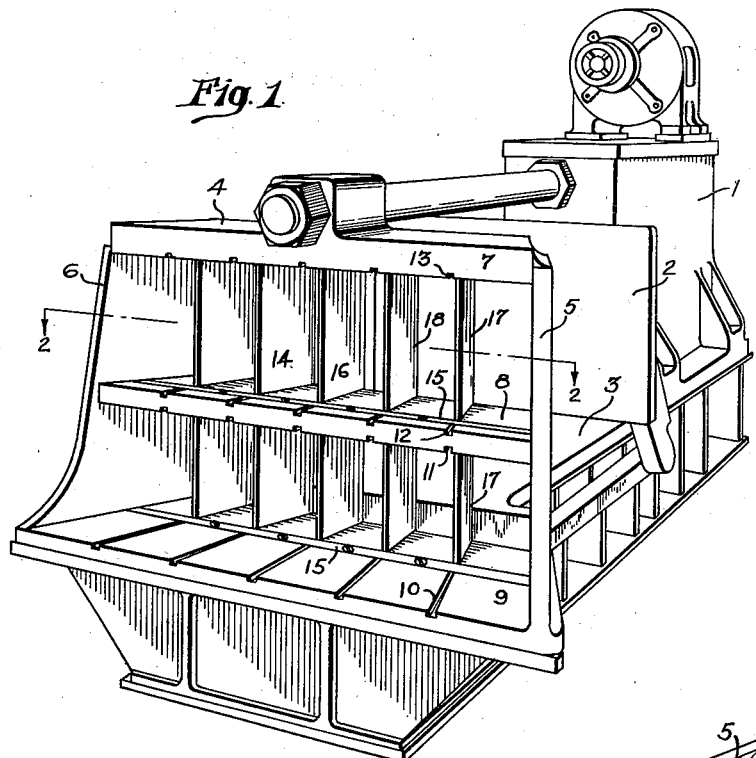
Fig. 1 is a perspective of a rubber cutter viewed from the rear of the knife arrangement.

In the particular embodiment of the invention such as is disclosed herein merely for the purpose of illustrating one specific form among possible others that the invention might take in practice, I have shown a rubber bale cutter of the general type disclosed in my application Serial No. 43,059, filed October 1, 1935, now Patent No. 2,105,215. This type of press comprises generally a hydraulic ram and cylinder mechanism contained within a housing 1 for horizontally reciprocating an upright platen 2. A rubber bale is placed on a table 3 and is moved forward by platen 2 against the forward edges of my improved knife arrangement generally indicated at 4.

This knife arrangement comprises relatively heavy sides 5 and 6, a top 7 and an intermediate horizontal partition 8. The sides 5 and 6 extend upwardly from a base 9 depressed below table 3, while a series of slots 10, 11, 12 and 13 are formed respectively in base 9, partition 8 and top 11. Knife blades 14 which are relatively deep in the direction of travel, but comparatively narrow transversely, are inserted in said grooves and suitably held therein by transverse keys such as 15.

Figure 2:
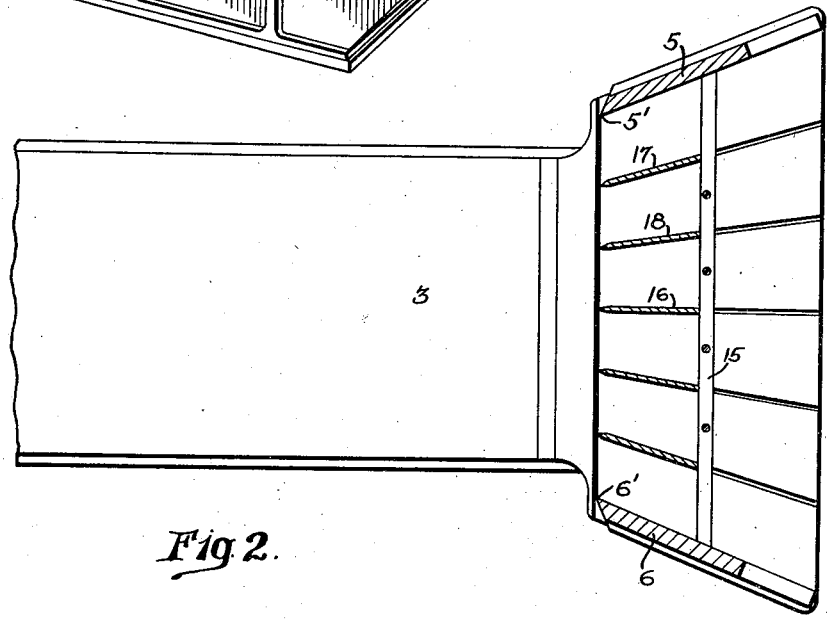
Fig. 2 is a horizontal section taken substantially on the line 2—2 of Fig. 1.

It will be noted that the sides 5 and 6 are disposed at a decided angle to the longitudinal center line of the machine, and that the center blade 16 is in alignment with the longitudinal axis of the machine. The specific blades 17 and 18 are placed at successively smaller angles than the sides 5 and 6 and similarly for the blade arrangement on the other side of the center blade 16. The result is that the walls of the blades together with sides 5 and 6 diverge with respect to each other, thereby insuring that as the rubber bale passes the front cutting edge of the knives, the cut rubber will be relatively free of the walls thereby insuring maximum freedom from frictional resistance. Also this tends to free the cut rubber at the cutting edge of the blades with the result that the rubber is adapted to be cut with a high degree of efficiency and effectiveness. The front edges of the knives as is clearly shown in Fig. 2 preferably all lie within a common vertical plane and the front edges of the sides 5 and 6 and top 7 are also provided with a cutting edge at their inner surface as indicated at 5′ and 6′.

From the foregoing disclosure, it is seen that I have provided a blade arrangement that is simple and economical in construction, operation and maintenance and is highly effective in permitting the rubber bale to be cut with minimum power and minimum danger of damage to or wear or breakage of the knives.

It will of course be understood that various changes in details of construction and arrangement of parts may be made by those skilled in the art without departing from the spirit of the invention as set forth in the appended claims.

I claim:

1. A rubber bale cutter having a plurality of knife blades diverging relative to each other and from the direction in which the rubber is passed between said blades.

2. A rubber bale cutter having a plurality of vertically extending knife blades which diverge relative to each other and from the direction in which the rubber is passed between said blades.

3. A rubber bale cutter having a plurality of knives one of which is located substantially centrally and the others of which on each side of said central blade are positioned at increasing angles with respect to the center blade and arranged so that passages formed between all of said blades diverge from the direction in which rubber is passed therethrough.

4. A rubber bale cutter having a base, top and intermediate partition all connected by vertical sides which are placed at diverging angles with respect to each other, and vertical blades supported by said top and partition and also by said base and partition and positioned so as to provide diverging passages between the blades and sides in the direction in which rubber is passed therethrough.

RICHARD W. DINZL.